US011421598B2

(12) United States Patent
Duesler et al.

(10) Patent No.: US 11,421,598 B2
(45) Date of Patent: Aug. 23, 2022

(54) STAGGERED HEAT EXCHANGER ARRAY WITH SIDE CURTAINS

(71) Applicant: United Technologies Corporation, Farmington, CT (US)

(72) Inventors: Paul W. Duesler, Manchester, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 66 days.

(21) Appl. No.: 16/781,424

(22) Filed: Feb. 4, 2020

(65) Prior Publication Data
US 2020/0248625 A1 Aug. 6, 2020

Related U.S. Application Data

(63) Continuation of application No. 15/000,618, filed on Jan. 19, 2016, now Pat. No. 10,563,582.

(51) Int. Cl.
*F02C 7/18* (2006.01)
*F28D 1/053* (2006.01)
(Continued)

(52) U.S. Cl.
CPC .............. *F02C 7/18* (2013.01); *F02C 7/14* (2013.01); *F02C 7/185* (2013.01); *F02K 3/115* (2013.01);
(Continued)

(58) Field of Classification Search
CPC .............. F28D 7/106; F28D 1/05375; F28D 2021/0026; F28D 1/0426; F28D 1/0435;
(Continued)

(56) References Cited

U.S. PATENT DOCUMENTS 4,187,675 A * 2/1980 Wakeman ........... F28D 21/0014
60/806
5,927,390 A 7/1999 Lehman
(Continued)

FOREIGN PATENT DOCUMENTS

FR 2058216 A1 5/1971
JP H08247683 A 9/1996
(Continued)

OTHER PUBLICATIONS

Extended European Search Report for EP Application No. 17150164.6, dated May 22, 2017, 8 Pages.

*Primary Examiner* — Stephanie Sebasco Cheng
(74) *Attorney, Agent, or Firm* — Kinney & Lange, P.A.

(57) ABSTRACT

A heat exchanger array includes a first row of heat exchangers, a second row of heat exchangers, and side curtains. The first row heat exchangers are spaced apart to define first gaps. The second row heat exchangers are spaced apart to define second gaps and are positioned downstream of and staggered from the first row heat exchangers such that the second row heat exchangers are aligned with the first gaps and the first row heat exchangers are aligned with the second gaps. Each side curtain is in close proximity to a first row heat exchanger and a second row heat exchanger. The side curtains define a neck region upstream of and aligned with each first row heat exchanger and each second row heat exchanger. Each neck region has a neck area that is less than a frontal area of the heat exchanger with which it is aligned.

21 Claims, 4 Drawing Sheets

(51) Int. Cl.
*F28F 13/06* (2006.01)
*F28D 1/04* (2006.01)
*F28F 13/08* (2006.01)
*F02K 3/115* (2006.01)
*F02C 7/14* (2006.01)
*F28D 21/00* (2006.01)
*F28D 1/02* (2006.01)
*F02C 3/04* (2006.01)
*F02C 7/36* (2006.01)
*F02C 9/18* (2006.01)

(52) U.S. Cl.
CPC ......... *F28D 1/0426* (2013.01); *F28D 1/0452* (2013.01); *F28D 1/05308* (2013.01); *F28D 1/05333* (2013.01); *F28D 1/05341* (2013.01); *F28F 13/06* (2013.01); *F28F 13/08* (2013.01); *F02C 3/04* (2013.01); *F02C 7/36* (2013.01); *F02C 9/18* (2013.01); *F05D 2220/32* (2013.01); *F05D 2250/34* (2013.01); *F05D 2260/211* (2013.01); *F05D 2260/213* (2013.01); *F05D 2260/2214* (2013.01); *F05D 2260/40311* (2013.01); *F05D 2260/98* (2013.01); *F28D 1/024* (2013.01); *F28D 2021/0021* (2013.01); *F28D 2021/0026* (2013.01); *F28D 2021/0089* (2013.01); *F28F 2250/00* (2013.01); *Y02T 50/60* (2013.01)

(58) Field of Classification Search
CPC ........ F28D 1/0443; F02K 3/105; F02K 3/115; F02C 7/12; F02C 7/14; F02C 7/141; F02C 7/143; F02C 7/16; F02C 7/18; F02C 7/185; F02C 9/18; F01D 25/08; F01D 25/12; F01D 25/14; B60K 11/08; F01P 2003/182; F01P 2003/185; F01P 2003/187; F28F 13/08; Y10S 165/311; Y10S 165/312; Y10S 165/313
See application file for complete search history.

(56) References Cited

U.S. PATENT DOCUMENTS

| | | | |
|---|---|---|---|
| 6,668,915 B1* | 12/2003 | Materna | F28F 1/10 165/146 |
| 8,329,126 B2* | 12/2012 | Freeman | B01D 53/86 423/210 |
| 2007/0264133 A1 | 11/2007 | Schwarz et al. | |
| 2008/0006396 A1* | 1/2008 | Upadhya | F28F 9/262 165/121 |
| 2008/0028763 A1* | 2/2008 | Schwarz | F01D 25/12 60/771 |
| 2008/0053060 A1 | 3/2008 | Olver | |
| 2009/0288387 A1 | 11/2009 | Baltas | |
| 2015/0047315 A1 | 2/2015 | Snyder | |

FOREIGN PATENT DOCUMENTS

| | | |
|---|---|---|
| WO | WO2008005404 A2 | 1/2008 |
| WO | WO2014143210 A1 | 9/2014 |

* cited by examiner

STAGGERED HEAT EXCHANGER ARRAY WITH SIDE CURTAINS

CROSS-REFERENCE TO RELATED APPLICATION(S)

This application is a continuation of U.S. application Ser. No. 15/000,618 filed Jan. 19, 2016 for "STAGGERED HEAT EXCHANGER ARRAY WITH SIDE CURTAINS," which is hereby incorporated by reference.

BACKGROUND

The present disclosure relates generally to gas turbine engines, and more particularly to a heat exchanger array.

A gas turbine engine typically includes a high pressure spool, a combustion system, and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a fan connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressor and the fan to sustain the combustion process.

The high energy gases contain a substantial amount of thermal energy, which is transferred to the high and low pressure turbines. Therefore, the high and low pressure turbines are cooled using air that is bled from the high pressure compressor. This cooling air can be cooled using a heat exchanger prior to flowing to the turbines in order to maximize the cooling capacity of the cooling air. In such an arrangement, the cooling air flows through the hot side of the heat exchanger, and another fluid must be used for the cold side of the heat exchanger.

SUMMARY

According to one embodiment of the present invention, a heat exchanger array includes a first row of heat exchangers with a hot side and a cold side, a second row of heat exchangers with a hot side and a cold side, and side curtains. The heat exchangers of the first row are spaced apart to define first gaps. The heat exchangers of the second row are spaced apart to define second gaps and are positioned downstream of and staggered from the heat exchangers of the first row such that the heat exchangers of the second row are aligned with the first gaps and the heat exchangers of the first row are aligned with the second gaps. Each of the side curtains is in close proximity to a heat exchanger in the first row and a heat exchanger in the second row. The side curtains are arranged to define a neck region upstream of and aligned with each heat exchanger in the first row and each heat exchanger in the second row. Each neck region has a neck area that is less than a frontal area of the heat exchanger with which it is aligned.

According to another embodiment of the present invention, a gas turbine engine includes a fan section, a compressor section downstream of the fan section, a combustor section downstream of the compressor section, a first turbine section downstream of the combustor section, the first turbine section being connected to the compressor section, a second turbine section downstream of the first turbine section, the second turbine section being connected to the fan section, and a heat exchanger array that is fluidly connected to secondary air from the fan section. The heat exchanger array includes a first row of heat exchangers spaced apart to define first gaps, a second row of heat exchangers spaced apart to define second gaps, and side curtains. Each of the side curtains is in close proximity to one of the heat exchangers in the first row and one of the heat exchangers in the second row. The side curtains define a set of first passages and a set of second passages. In each first passage, secondary air flows through one of the heat exchangers in the first row and subsequently through one of the second gaps. In each second passage, the secondary air flows through one of the first gaps and subsequently through one of the heat exchangers in the second row heat.

DETAILED DESCRIPTION

Figure 1:
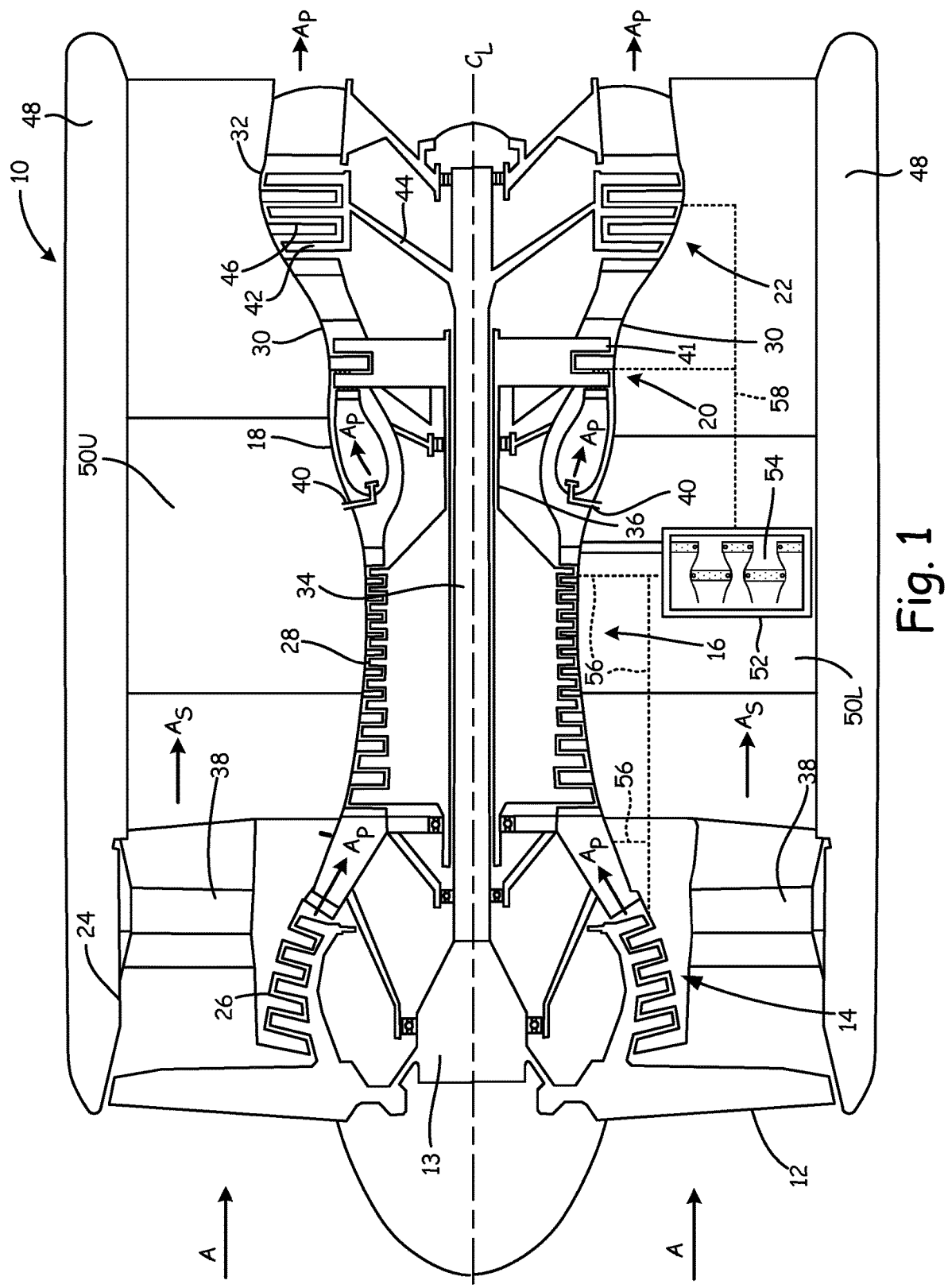
FIG. 1 is a schematic side cross-section view of an embodiment of a gas turbine engine.

FIG. 1 is a schematic side cross-section view of gas turbine engine 10. Although FIG. 1 depicts a turbofan gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, gearbox 13, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, nacelle 48, upper bifurcation 50U, lower bifurcation 50L, bracket 52, heat exchanger array 54, bleed air flow path 56, cooled bleed air flow path 58, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

Depicted in FIG. 1 is one embodiment of gas turbine engine 10, to which there are alternative embodiments. For example, gas turbine engine 10 can be a three spool engine. In such an embodiment, gas turbine engine 10 has an intermediate compressor between LPC 14 and HPC 16 and an intermediate turbine between HPT 20 and LPT 22, wherein the intermediate compressor is connected to the intermediate turbine with an additional shaft.

Nacelle 48 is adjacent to fan case 24 and defines a substantially annular duct around the core engine within LPC case 26, HPC case 28, HPT case 30 and LPT case 32. Nacelle 48 is bifurcated with upper bifurcation 50U and lower bifurcation 50L. Upper bifurcation 50U and lower bifurcation 50L cover support elements, such as electrical lines, hydraulic lines, fuel lines, lubricant carrying lines, for the core engine within LPC case 26, HPC case 28, HPT case 30 and LPT case 32. Upper bifurcation 50U and lower bifurcation 50L also define upper and lower bifurcation ducts, which provide space to fit additional components into gas turbine engine 10, such as heat exchanger array 54. In the embodiment shown, heat exchanger array 54 is located in lower bifurcation 50L and is attached to the core engine with bracket 52. In alternative embodiments, heat exchanger array 54 can be located in upper bifurcation 50U or both lower bifurcation 50L and upper bifurcation 50U.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly or through gearbox 13 as shown) to accelerate secondary air $A_S$ (also known as bypass air, such as fan air) through exit guide vanes 38 and through nacelle 48, thereby producing a major portion of the thrust output of engine 10. Primary air $A_P$ (also known as gas path air) is directed first into LPC 14 and then into HPC 16. LPC 14 and HPC 16 work together to incrementally step up the pressure of primary air $A_P$. HPC 16 is rotated by HPT 20 through low pressure shaft 34 to provide compressed air to combustor section 18. The compressed air is delivered to combustor section 18, along with fuel through injectors 40, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in LPC 14 and HPC 16 and participating in a combustion process in combustor section 18 to increase pressure and energy, primary air $A_P$ flows through HPT 20 and LPT 22 such that HPT blades 41 and LPT blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns fan 12 and LPC 14.

In addition, a portion of primary air $A_P$ (bleed air) can be bled off from at least one of LPC 14, HPC 16, and in between LPC 14 and HPC 16 for use as cooling air. The bleed air is cooled in multiple heat exchangers in heat exchanger array 54 prior to being used to cool components of HPT 20 and LPT 22. The bleed air travels through cooling air flow path 56 from at least one of LPC 14, HPC 16, and in between LPC 14 and HPC 16 to the hot side of the heat exchangers in heat exchanger array 54. The cold side of the heat exchangers in heat exchanger array 54 receives secondary air $A_S$, which is used to cool the bleed air in the hot side of the heat exchangers in heat exchanger array 54. The cooled bleed air leaves heat exchanger array 54 and travels to at least one of HPT 20 and LPT 22 via cooled bleed air flow path 58 to cool the components in HPT 20 and LPT 22.

It is advantageous to cool components of HPT 20 and LPT 22, because the temperatures of the components in HPT 20 and LPT 22 would rise to excessively high levels if left unchecked. It can also be desirable to operate HPT 20 and LPT 22 at higher temperatures to increases the fuel efficiency of gas turbine engine 10. Cooling the bleed air in heat exchanger array 54 increases the cooling capacity of the bleed air, which allows for higher operating temperatures in HPT 20 and LPT 22 while keeping the components therein within their allowable thermal operating ranges.

Figure 2:
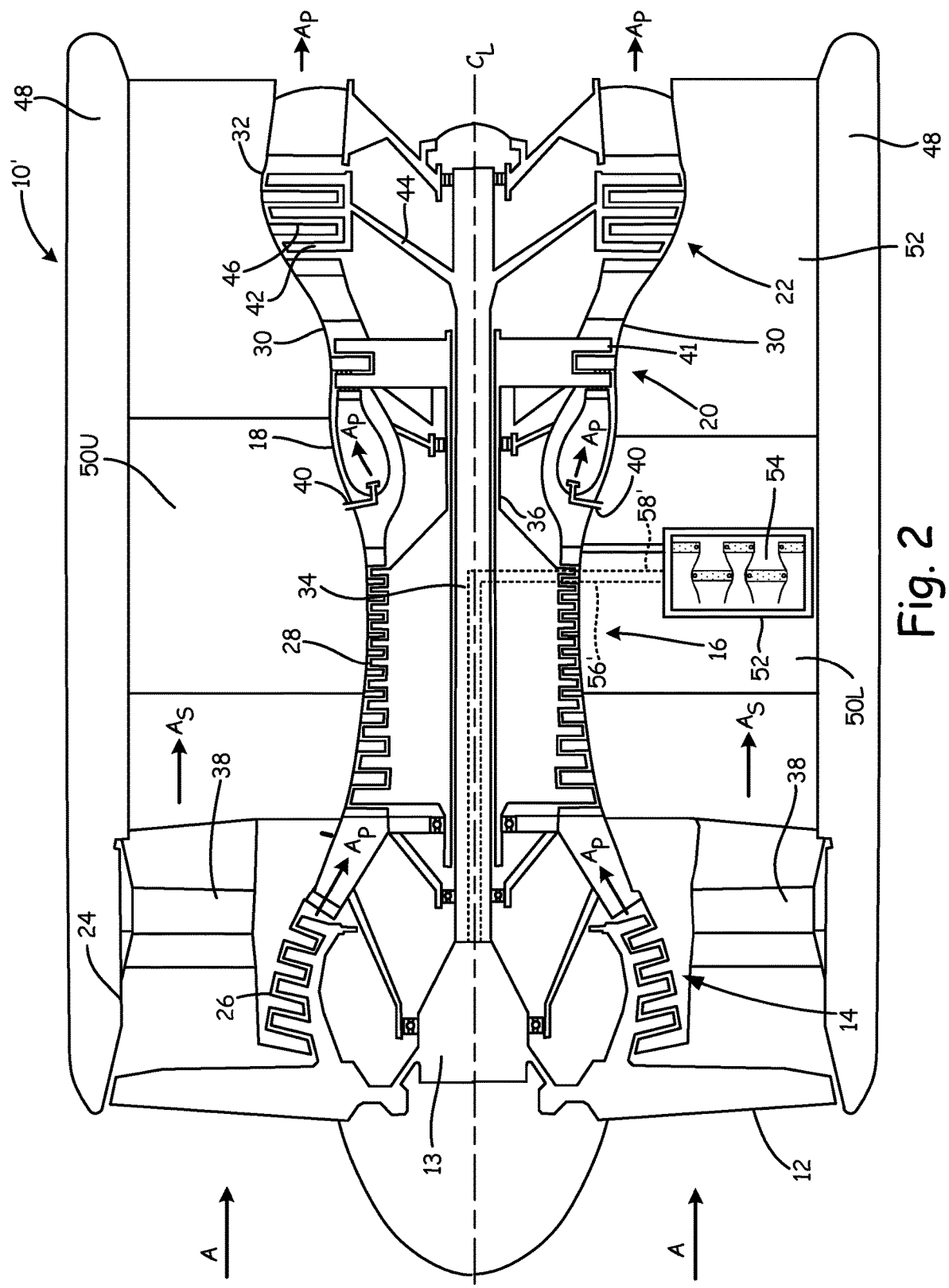
FIG. 2 is a schematic side cross-section view of another embodiment of the gas turbine engine in FIG. 1.

FIG. 2 is a schematic side cross-section view of gas turbine engine 10', another embodiment of gas turbine engine 10 in FIG. 1. Shown in FIG. 2 are gas turbine engine 10', fan 12, gearbox 13, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, nacelle 48, upper bifurcation 50U, lower bifurcation 50L, bracket 52, heat exchanger array 54, oil flow path 56', cooled oil flow path 58', inlet air A, primary air $A_P$, secondary air $A_S$ (also known as bypass air), and longitudinal engine centerline axis $C_L$.

Gas turbine engine 10' is structurally and functionally substantially similar to gas turbine engine 10 of FIG. 1, except heat exchanger array 54 is used to cool the oil in gearbox 13 instead of being used to cool cooling air. Oil from gearbox 13 travels through oil flow path 56' to the hot side of the heat exchangers in heat exchanger array 54. The cold side of the heat exchangers in heat exchanger array 54 receives secondary air $A_S$, which is used to cool the oil in the hot side of the heat exchangers in heat exchanger array 54. The cooled oil leaves heat exchanger array 54 and travels back to gearbox 13 via cooled oil flow path 58'.

Figure 3:
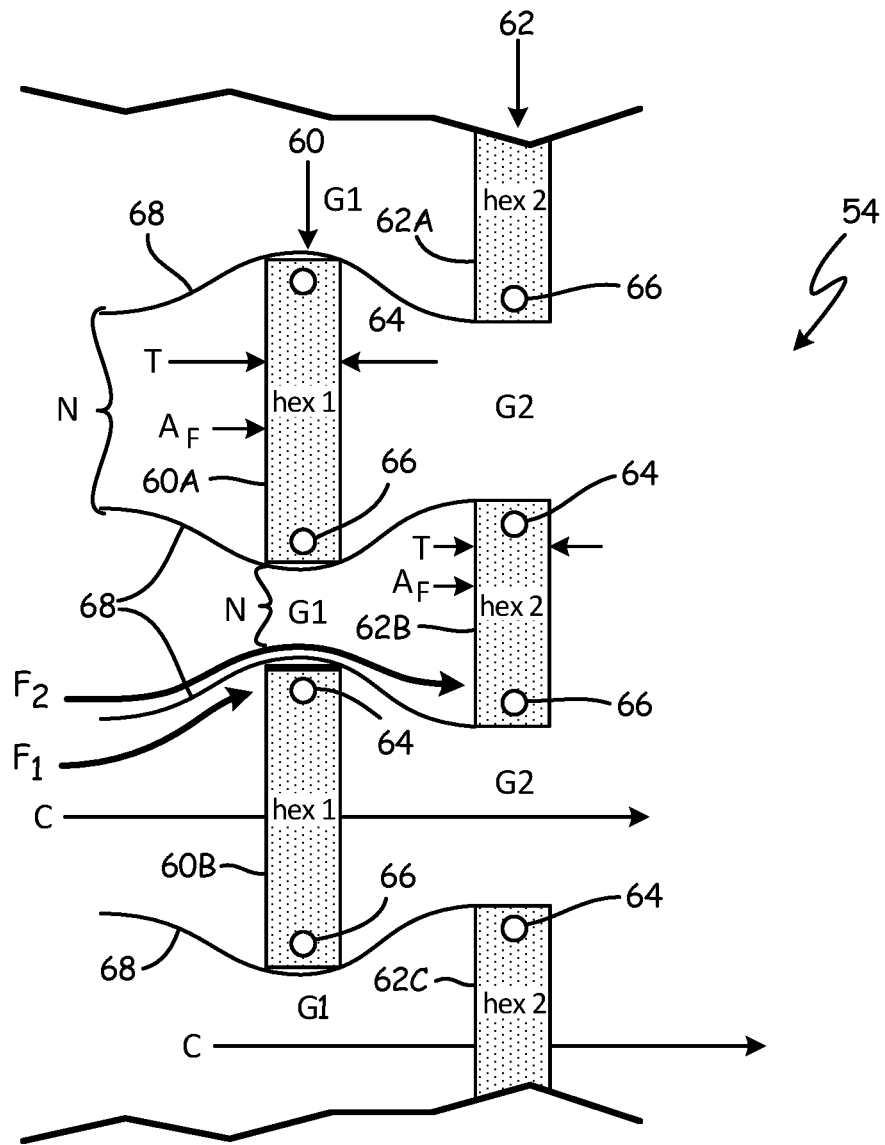
FIG. 3 is a schematic cross-sectional view of one embodiment of a portion of a heat exchanger array of the gas turbine engine in FIGS. 1 and 2.

FIG. 3 is a schematic cross-sectional view of a portion of heat exchanger array 54, seen in gas turbine engine 10 in FIG. 1 and gas turbine engine 10' in FIG. 2. Heat exchanger array 54 includes first row 60 with heat exchangers 60A and 60B and second row 62 with heat exchangers 62A, 62B, and 62C. Each of heat exchangers 60A-60B and 62A-62C has thickness T and frontal area $A_F$. In the embodiment shown, first row 60 includes two heat exchangers and second row 62 includes three heat exchangers. In alternate embodiments, first row 60 and second row 62 can include any number of heat exchangers. Heat exchangers 60A-60B and 62A-62C include intakes 64 and exhausts 66. Heat exchanger array 54 also includes side curtains 68. FIG. 3 also shows stream tube $F_1$, stream tube $F_2$, and cold fluid C.

In first row 60, heat exchangers 60A and 60B are spaced apart from one another by gaps G1. In second row 62, heat exchangers 62A-62C are also spaced apart from one another by gaps G2. Additionally, heat exchangers 62A-62C of second row 62 are positioned downstream of and staggered from heat exchangers 60A-60B of first row 60 such that heat exchangers 62A-62C are interleaved between heat exchangers 60A and 60B. Heat exchangers 60A-60B are aligned with gaps G2, and heat exchangers 62A-62C are aligned with gaps G1. Heat exchangers 60A-60B in first row 60 can be the same size as heat exchangers 62A-C in second row 62. In alternative embodiments, heat exchangers 60A-60B can be smaller or larger than heat exchangers 62A-62C. In the embodiment shown, heat exchangers 60A-60B and 62A-62C are shell and tube heat exchangers. In alternative embodiments, heat exchangers 60A-60B and 62A-62C can be any type of heat exchangers, including plate fin heat exchangers and heat exchangers made by additive manufacturing.

Each of heat exchangers 60A-60B and 62A-62C is in close proximity to a pair of side curtains 68 such that a somewhat leak proof seal is formed between a pair of side curtains 68 and each of corresponding heat exchangers 60A-60B and 62A-62C. Side curtains 68 can be made of metallic or composite material. Heat exchangers 60A-60B and 62A-62C can be attached to side curtains 68 with fasteners such as bolts or rivets, or can be welded to side curtains 68. Side curtains 68 define neck regions N. Each neck region N is positioned upstream of and aligned with one of heat exchangers 60A-60B and 62A-62C. Each neck region N has a neck area that is less than frontal area $A_F$ of each of heat exchangers 60A-60B and 62A-62C with which each neck region N is aligned.

Side curtains 68 and heat exchangers 60A-60B and 62A-62C define passages for cold fluid C through first row 60 and second row 62. When cold fluid C flows through each of heat exchangers 60A-60B in first row 60, cold fluid C first flows through one of neck regions N, then through one of heat exchangers 60A or 60B, and finally through one of gaps G2. When cold fluid C flows through each of heat exchangers 62A-62C, cold fluid C first flows through one of gaps G1 and one of neck regions N prior to flowing through one of heat exchangers 62A-62C.

Heat exchanger array 54 can be used to cool a fluid, such as bleed air from the HPC or LPC in gas turbine engine 10 of FIG. 1, oil from gearbox 13 in gas turbine engine 10' in FIG. 2, or any other fluid that requires cooling. Heat exchangers 60A-60B and 62A-62C receive a hot fluid through intakes 64. The hot fluid is cooled by cold fluid C passing through each of heat exchangers 60A-60B and 62A-62C as described above. Cold fluid C can be secondary air $A_S$ (also known as bypass air such as fan air) in gas turbine engine 10 in FIG. 1 and gas turbine engine 10' in FIG. 2, or any other suitable fluid. The cooled fluid leaves heat exchangers 60A-60B and 62A-62C through exhausts 66.

Thickness T of heat exchangers 60A-60B and 62A-62C can be relatively small if there is a significant difference in temperature and pressure between the cold side and hot side of each of heat exchangers 60A-60B and 62A-62C. For example, if the hot fluid is bleed air in gas turbine engine 10 of FIG. 1, the temperature of the hot fluid can be 1000 degrees Fahrenheit (538° C.) or even higher, and the pressure of the hot fluid can be 500 psi or higher. If cold fluid C is secondary air such as fan air, the temperature can be between approximately 0 degrees Fahrenheit (−18° C.) and 50 degrees Fahrenheit (10° C.), and the pressure is close to ambient pressure, or 1 psi (6891 Pascal). The significant temperature difference between the cold side and hot side of heat exchangers 60A-60B and 62A-62C causes cold fluid C to reach the same temperature as the hot fluid very quickly as the cold fluid passes through heat exchangers 60A-60B and 62A-62C. Therefore, thickness T of heat exchanger 60A-60B and 62A-62C can be optimized based on the anticipated temperature difference between cold fluid C and the hot fluid.

Heat exchanger array 54 is advantageous, because the arrangement of first row 60 and second row 62 allows for greater heat transfer than is possible with a single row of heat exchangers, as adding a second row of heat exchangers increases frontal area for heat transfer. This is particularly advantageous in the context of gas turbine engines, such as gas turbine engine 10 of FIG. 1 and gas turbine engine 10' of FIG. 2, because there is limited space in which to fit heat exchangers in order to provide cooled cooling air to the LPT and HPT or to cool the oil in the gearbox.

The shape of side curtains 68 prevents turbulent flow from occurring as cold fluid C enters heat exchangers 60A-60B and 62A-62C. When cold fluid C flows towards heat exchanger 60B, for example, cold fluid C experiences a "blockage" due to the physical blockage created by heat exchanger 60B. Without side curtains 68, the physical blockage would cause stream tubes of cold fluid C to splay laterally away from heat exchanger 60B, particularly at the edges of heat exchanger B. The resulting turbulence would cause a pressure drop, which could reduce the thrust in gas turbine engine 10 of FIG. 1, for example. Side curtains 68 keep stream tubes of cold fluid C flowing in an orderly fashion as the stream tubes approach heat exchanger 60B, as represented by stream tube $F_1$ in FIG. 3. Side curtains 68 also direct stream tubes past first row 60 and through gaps G2 so that cold fluid C approaches second row 62 without pressure losses, as represented by stream tube $F_2$ in FIG. 3.

When cold fluid C flows towards heat exchanger 60B, for example, cold fluid C also experiences a "blockage" due to the difference in the flow parameter of cold fluid C as it approaches heat exchanger 60B and the flow parameter within heat exchanger 60B as cold fluid C is removes heat from the hot side of heat exchanger 60B. Flow parameter= $((w*(T^0.5))/(A*P))$, where w=mass flow, T=temperature, A=local area, and P=local pressure. The flow parameter within heat exchanger 60B is much less than the flow parameter of cold fluid C as it approaches heat exchanger 60B due to the significant heat addition that occurs in heat exchanger 60B. Neck N created by the shape of side curtains 68 significantly reduces the difference in flow parameter between heat exchanger 60B and cold fluid C. The shape of side curtains 68 thus also allows for first row 60 and second row 62 to be equally effective in transferring heat, even though second row 62 is downstream of first row 60, as cold fluid C enters heat exchangers 62A-62C of second row 62 with almost the same pressure as cold fluid C enters heat exchangers 60A-60B of first row 60.

Figure 4:
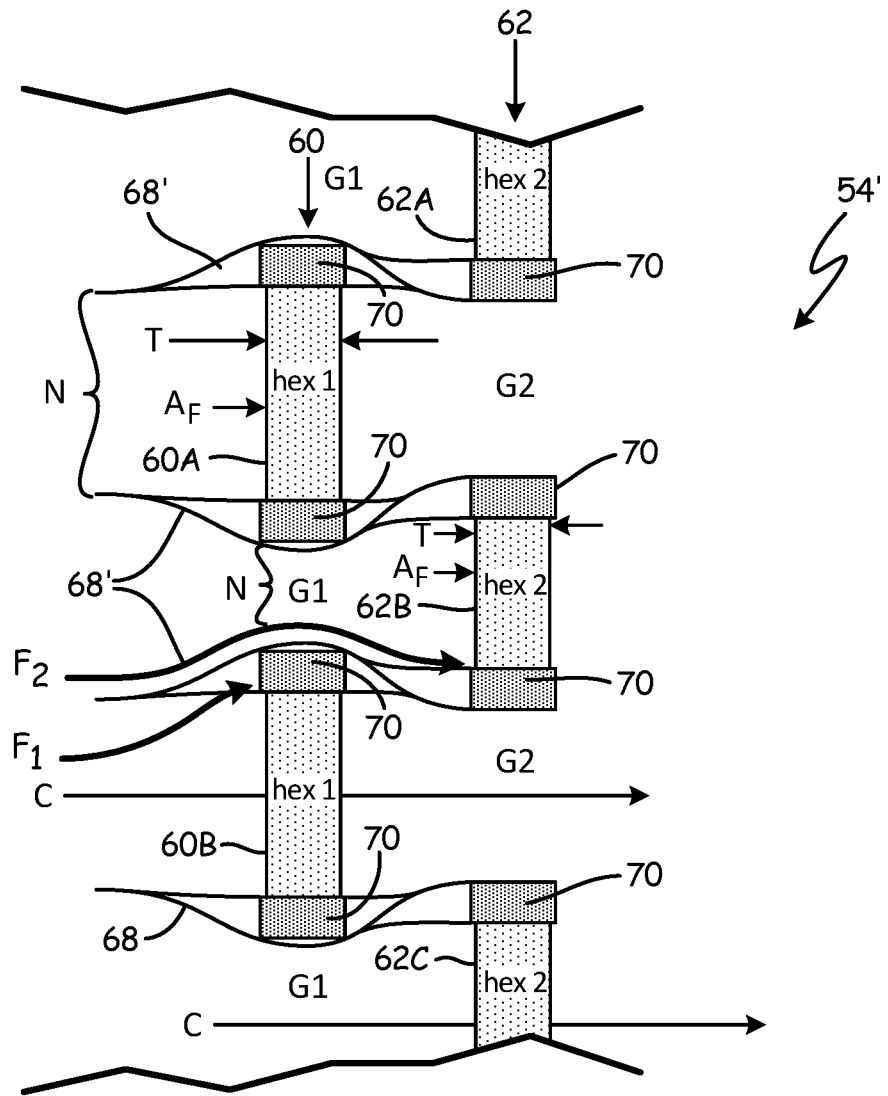
FIG. 4 is a schematic cross-sectional view of another embodiment of a portion of a heat exchanger array of the gas turbine engine in FIGS. 1 and 2.

FIG. 4 is a schematic cross-sectional view of heat exchanger array 54', another embodiment of heat exchanger array 54 of FIG. 3. Heat exchanger array 54' includes first row 60 with heat exchangers 60A and 60B and second row 62 with heat exchangers 62A, 62B, and 62C. Heat exchangers 60A-60B and 62A-62C includes intakes 64 and exhausts 66 (shown in FIG. 3). Intakes 64 and exhausts 66 are covered by fairings 70. Heat exchanger array 54' also includes double walled side curtains 68'. Each of heat exchangers 60A-60B and 62A-62C has a thickness T and a frontal area $A_F$. FIG. 4 also shows stream tube $F_1$, stream tube $F_2$, and cold fluid C.

Heat exchanger array 54' is substantially similar to heat exchanger array 54 of FIG. 3, except heat exchanger array 54' also includes double walled side curtains 68' and fairings 70. Intakes 64 and exhausts 66 can cause turbulent flow near the edges of heat exchangers 60A-60B and 62A-62C. Fairings 70 cover intakes 64 and exhausts 66, which further prevents stream tubes of cold fluid C from splaying away from heat exchangers 60A-60B and 62A-62C and causing turbulent flow as cold fluid C approaches first row 60 and second row 62. Double walled side curtains 68' also further prevents turbulent flow, as fairings 70 can be placed into pockets of double walled side curtains 68' to further remove intakes 64 and exhausts 66 from the flow path of cold fluid C.

In the embodiment shown, heat exchanger array 54' includes both fairings 70 and double walled side curtains 68'. In alternate embodiments, heat exchanger array 54' can include fairings 70 without double walled side curtains 68' or double walled side curtains 68' without fairings 70. In another alternate embodiment, heat exchanger array 54' can include double walled side curtains with pockets for heat exchangers 60A-60B of first row 60 without pockets for heat exchangers 62A-62C of second row 62.

Discussion of Possible Embodiments

The following are non-exclusive descriptions of possible embodiments of the present invention.

A heat exchanger array according to an exemplary embodiment of this invention, among other possible things includes: a heat exchanger array with a first row of heat exchangers with a hot side and a cold side, a second row of heat exchangers with a hot side and a cold side, and side curtains. The heat exchangers of the first row are spaced apart to define first gaps. The heat exchangers of the second row are spaced apart to define second gaps and are positioned downstream of and staggered from the heat exchangers of the first row such that the heat exchangers of the second row are aligned with the first gaps and the heat exchangers of the first row are aligned with the second gaps. Each of the side curtains is in close proximity to a heat exchanger in the first row and a heat exchanger in the second row. The side curtains are arranged to define a neck region upstream of and aligned with each heat exchanger in the first row and each heat exchanger in the second row. Each neck region has a neck area that is less than a frontal area of the heat exchanger with which it is aligned.

The heat exchanger array of the preceding paragraph can optionally include, additionally and/or alternatively, any one or more of the following features, configurations and/or additional components:

A further embodiment of the foregoing heat exchanger array, wherein the heat exchanger array is located in at least one of an upper bifurcation and a lower bifurcation of a nacelle of a gas turbine engine.

A further embodiment of any of the foregoing heat exchanger arrays, wherein the hot side of each of the heat exchangers is fluidly connected to at least one of a low pressure compressor and a high pressure compressor and the cold side of each of the heat exchangers is positioned to receive secondary air from a fan.

A further embodiment of any of the foregoing heat exchanger arrays, wherein the hot side of each of the plurality of heat exchangers is fluidly connected to oil from a gearbox of the gas turbine engine and the cold side of each of the plurality of heat exchangers is positioned to receive secondary air from a fan.

A further embodiment of any of the foregoing heat exchanger arrays, wherein the side curtains are formed of metallic or composite material.

A further embodiment of any of the foregoing heat exchanger arrays, wherein the side curtains form a leak proof seal with the heat exchangers.

A further embodiment of any of the foregoing heat exchanger arrays, wherein each of the heat exchangers has a first portion with an intake covered by a first fairing and a second portion with an exhaust covered by a second fairing.

A further embodiment of any of the foregoing heat exchanger arrays, wherein each of the plurality of side curtains includes a first pocket for receiving the first fairing or the second fairing of one of the heat exchangers in the first row.

A further embodiment of any of the foregoing heat exchanger arrays, wherein each of the plurality of side curtains further includes a second pocket for receiving the first fairing or the second fairing of one of the heat exchangers in the second row.

A further embodiment of any of the foregoing heat exchanger arrays, wherein each of the heat exchangers is a shell and tube heat exchanger, a plate fin heat exchanger, or a heat exchanger formed by additive manufacturing.

A gas turbine engine according to an exemplary embodiment of this invention, among other possible things includes: a fan section, a compressor section downstream of the fan section, a combustor section downstream of the compressor section, a first turbine section downstream of the combustor section, the first turbine section being connected to the compressor section, a second turbine section downstream of the first turbine section, the second turbine section being connected to the fan section, and a heat exchanger array that is fluidly connected to secondary air from the fan section. The heat exchanger array includes a first row of heat exchangers spaced apart to define first gaps, a second row of heat exchangers spaced apart to define second gaps, and side curtains. Each of the side curtains is in close proximity to one of the heat exchangers in the first row and one of the heat exchangers in the second row. The side curtains define a set of first passages and a set of second passages. In each first passage, secondary air flows through one of the heat exchangers in the first row and subsequently through one of the second gaps. In each second passage, the secondary air flows through one of the first gaps and subsequently through one of the heat exchangers in the second row heat.

The gas turbine engine of the preceding paragraph can optionally include, additionally and/or alternatively, any one or more of the following features, configurations and/or additional components:

A further embodiment of the foregoing gas turbine engine, wherein the plurality of side curtains of the heat exchanger array are arranged to define a plurality of neck regions, each neck region positioned upstream of and aligned with one heat exchanger of the first row or one heat exchanger of the second row, wherein each neck region is narrower than a frontal area of the heat exchanger with which it is aligned.

A further embodiment of any of the foregoing gas turbine engines, wherein the heat exchanger array is located in at least one of an upper bifurcation and a lower bifurcation of a nacelle of the gas turbine engine.

A further embodiment of any of the foregoing gas turbine engines, wherein the heat exchanger array is configured to receive bleed air from the compressor section and configured to exhaust cooled bleed air for delivery to at least one of the first turbine section and the second turbine section.

A further embodiment of any of the foregoing gas turbine engines, wherein the heat exchanger array is configured to receive oil from a gearbox of the gas turbine engine and configured to exhaust cooled oil for delivery back to the gearbox.

A further embodiment of any of the foregoing gas turbine engines, wherein the side curtains of the heat exchanger array are formed of a metallic or composite material.

A further embodiment of any of the foregoing gas turbine engines, wherein the side curtains of the heat exchanger array form a leak proof seal with the heat exchangers.

A further embodiment of any of the foregoing gas turbine engines, wherein each of the heat exchangers of the heat exchanger array has a first portion with an intake covered by a first fairing and a second portion with an exhaust covered by a second fairing.

A further embodiment of any of the foregoing gas turbine engines, wherein each of the plurality of side curtains of the heat exchanger array includes a first pocket for receiving the first fairing or the second fairing of one of the heat exchangers in the first row and a second pocket for receiving the first fairing or the second fairing of one of the heat exchangers in the second row.

A further embodiment of any of the foregoing gas turbine engines, wherein each of the heat exchangers in the heat exchanger array is a shell and tube heat exchanger, a plate fin heat exchanger, or a heat exchanger formed by additive manufacturing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger array comprising:
a first row of heat exchangers, each with a respective hot side, a respective cold side, and a respective first frontal area, wherein the respective first frontal area of each of the heat exchangers of the first row are of a same first size and each of the heat exchangers of the first row are spaced apart to define first gaps;
a second row of heat exchangers downstream of the first row of heat exchangers, each with a respective hot side, a respective cold side, and a respective second frontal area, wherein the respective second frontal area of each of the heat exchangers of the second row are of a same second size, the first size of each of the first frontal areas of the heat exchangers of the first row being different from the second size of each of the second frontal areas of the heat exchangers of the second row, wherein the heat exchangers of the second row are spaced apart to define second gaps and are positioned downstream of and staggered from the heat exchangers of the first row such that each heat exchanger of the second row is aligned with a respective one of the first gaps and each heat exchanger of the first row is aligned with a respective one of the second gaps; and
a plurality of side curtains, each of the plurality of side curtains adjacent to one of the heat exchangers in the first row and one of the heat exchangers in the second row;
wherein the plurality of side curtains are arranged to define a first plurality of neck regions and a second plurality of neck regions, each neck region of the first plurality of neck regions being positioned upstream of and aligned with one respective heat exchanger of the first row of heat exchangers, and each neck region of the second plurality of neck regions being positioned upstream of and aligned with one respective heat exchanger of the second row of heat exchangers;
wherein each heat exchanger of the heat exchanger array is aligned with a neck region of the first plurality of neck regions or the second plurality of neck regions, and each neck region of the first plurality of neck regions and the second plurality of neck regions has a neck area that is less than the first frontal area or the second frontal area of the heat exchanger with which it is aligned;
wherein the plurality of side curtains define a set of first passages in each of which a cold fluid flows through one of the neck regions of the first plurality of neck regions, then through the corresponding heat exchanger of the first row of heat exchangers, and subsequently through the corresponding second gap of the second gaps; and
wherein the plurality of side curtains define a set of second passages in each of which the cold fluid flows through one of the first gaps and the corresponding neck region of the second plurality of neck regions, and subsequently through the corresponding heat exchanger of the second row of heat exchangers.

2. The heat exchanger array of claim 1, wherein the second frontal areas of the heat exchangers of the second row are smaller than the first frontal areas of the heat exchangers of the first row.

3. The heat exchanger array of claim 1, wherein the heat exchanger array is positioned within a turbofan gas turbine engine and is located in at least one of an upper bifurcation and a lower bifurcation of a nacelle of the gas turbine engine.

4. The heat exchanger array of claim 3, wherein the hot side of each of the heat exchangers of the heat exchanger array is fluidly connected to at least one of a low pressure compressor and a high pressure compressor and the cold side of each of the heat exchangers of the heat exchanger array is positioned to receive the cold fluid which is a bypass air from a fan.

5. The heat exchanger array of claim 3, wherein the hot side of each of the heat exchangers of the heat exchanger array is fluidly connected to oil from a gearbox of the gas turbine engine and the cold side of each of the heat exchangers of the heat exchanger array is positioned to receive the cold fluid which is a bypass air from a fan.

6. The heat exchanger array of claim 1, wherein the plurality of side curtains are formed of metallic or composite material.

7. The heat exchanger array of claim 1, wherein each of the heat exchangers of the heat exchanger array has a respective first portion with a respective intake covered by a respective first fairing and a respective second portion with a respective exhaust covered by a respective second fairing.

8. The heat exchanger array of claim 7, wherein each of the plurality of side curtains includes a first pocket for receiving the first fairing or the second fairing of one of the heat exchangers in the first row.

9. The heat exchanger array of claim 8, wherein each of the plurality of side curtains further includes a second pocket for receiving the first fairing or the second fairing of one of the heat exchangers in the second row.

10. The heat exchanger array of claim 1, wherein each of the heat exchangers of the heat exchanger array is a shell and tube heat exchanger, a plate fin heat exchanger, or a heat exchanger formed by additive manufacturing.

11. A gas turbine engine comprising:
a fan section;
a compressor section downstream of the fan section;
a combustor section downstream of the compressor section;
a first turbine section downstream of the combustor section, the first turbine section being connected to the compressor section;
a second turbine section downstream of the first turbine section, the second turbine section being connected to the fan section; and
a heat exchanger array that is fluidly connected to secondary air from the fan section, the heat exchanger array comprising:
a first row of heat exchangers spaced apart to define first gaps;
a second row of heat exchangers spaced apart to define second gaps, the second gaps being different in size from the first gaps; and
a plurality of side curtains, each of the plurality of side curtains adjacent to one of the heat exchangers in the first row and one of the heat exchangers in the second row;
wherein the plurality of side curtains are arranged to define a first plurality of neck regions and a second plurality of neck regions, each neck region of the first plurality of neck regions being positioned upstream of and aligned with one respective heat exchanger of the first row of heat exchangers, and each neck region of the second plurality of neck regions being positioned upstream of and aligned with one respective heat exchanger of the second row of heat exchangers;
wherein each heat exchanger of the heat exchanger array is aligned with a neck region of the first plurality of neck regions or the second plurality of neck regions, and each neck region of the first plurality of neck regions and the second plurality of neck regions is narrower than a frontal area of the heat exchanger with which it is aligned;
wherein the plurality of side curtains define a set of first passages in each of which the secondary air flows through one of the neck regions of the first plurality of neck regions, then through the corresponding heat exchanger of the first row of heat exchangers, and subsequently through the corresponding second gap of the second gaps; and
wherein the plurality of side curtains define a set of second passages in each of which the secondary air flows through one of the first gaps and the corresponding neck region of the second plurality of neck regions, and subsequently though the corresponding heat exchanger of the second row of heat exchangers.

12. The gas turbine engine of claim 11, wherein the heat exchanger array is located in at least one of an upper bifurcation and a lower bifurcation of a nacelle of the gas turbine engine.

13. The gas turbine engine of claim 11, wherein the second gaps are larger than the first gaps.

14. The gas turbine engine of claim 11, wherein the plurality of side curtains of the heat exchanger array are formed of a metallic or composite material.

15. The gas turbine engine of claim 11, wherein each of the side curtains of the plurality of side curtains forms a seal with one of the heat exchangers of the first row and one of the heat exchangers of the second row.

16. The gas turbine engine of claim 11, wherein each of the heat exchangers of the heat exchanger array has a respective first portion with a respective intake covered by a respective first fairing, and a respective second portion with a respective exhaust covered by a respective second fairing.

17. The gas turbine engine of claim 16, wherein each of the plurality of side curtains of the heat exchanger array includes a first pocket for receiving the first fairing or the second fairing of one of the heat exchangers in the first row, and a second pocket for receiving the first fairing or the second fairing of one of the heat exchangers in the second row.

18. The gas turbine engine of claim 11, wherein each of the heat exchangers in the heat exchanger array is a shell and tube heat exchanger, a plate fin heat exchanger, or a heat exchanger formed by additive manufacturing.

19. A heat exchanger array comprising:
a first row of heat exchangers, each with a respective hot side, a respective cold side, and a respective first frontal area, wherein the heat exchangers of the first row are spaced apart to define first gaps;
a second row of heat exchangers, each with a respective hot side, a respective cold side, and a respective second frontal area that is different from each of the first frontal areas of the heat exchangers of the first row, wherein the heat exchangers of the second row are spaced apart to define second gaps, the second gaps being different in size from the first gaps, and are positioned downstream of and staggered from the heat exchangers of the first row such that each heat exchanger of the second row is aligned with a respective one of the first gaps and each heat exchanger of the first row is aligned with a respective one of the second gaps; and
a plurality of side curtains, each of the plurality of side curtains adjacent to one of the heat exchangers in the first row and one of the heat exchangers in the second row;
wherein the plurality of side curtains are arranged to define a first plurality of neck regions and a second plurality of neck regions, each neck region of the first plurality of neck regions being positioned upstream of and aligned with one respective heat exchanger of the first row of heat exchangers, and each neck region of the second plurality of neck regions being positioned upstream of and aligned with one respective heat exchanger of the second row of heat exchangers;
wherein each heat exchanger of the heat exchanger array is aligned with a neck region of the first plurality of neck regions or the second plurality of neck regions and each neck region of the first plurality of neck regions and the second plurality of neck regions has a neck area that is less than the first frontal area or the second frontal area of the heat exchanger with which it is aligned;
wherein the plurality of side curtains define a set of first passages in each of which a cold fluid flows through one of the neck regions of the first plurality of neck regions, then through the corresponding heat exchanger of the first row of heat exchangers, and subsequently through the corresponding second gap of the second gaps; and
wherein the plurality of side curtains define a set of second passages in each of which the cold fluid flows through one of the first gaps and the corresponding neck region of the second plurality of neck regions, and subsequently through the corresponding heat exchanger of the second row of heat exchangers.

20. The heat exchanger array of claim 19, wherein the second frontal areas of the heat exchangers of the second row are smaller than the first frontal areas of the heat exchangers of the first row, and the second gaps are larger than the first gaps.

21. A heat exchanger array comprising:
a first row of heat exchangers, each with a respective hot side, a respective cold side, and a respective first frontal area, wherein the heat exchangers of the first row are spaced apart to define first gaps;
a second row of heat exchangers, each with a respective hot side, a respective cold side, and a respective second frontal area that is different from each of the first frontal areas of the heat exchangers of the first row, wherein the heat exchangers of the second row are spaced apart to define second gaps and are positioned downstream of and staggered from the heat exchangers of the first row such that each heat exchanger of the second row is aligned with a respective one of the first gaps and each heat exchanger of the first row is aligned with a respective one of the second gaps; and
a plurality of side curtains, each of the plurality of side curtains in close proximity to one of the heat exchangers in the first row and one of the heat exchangers in the second row;
wherein the plurality of side curtains are arranged to define a first plurality of neck regions and a second plurality of neck regions, each neck region of the first plurality of neck regions being positioned upstream of and aligned with one respective heat exchanger of the first row of heat exchangers, and each neck region of the second plurality of neck regions being positioned upstream of and aligned with one respective heat exchanger of the second row of heat exchangers;
wherein each heat exchanger of the heat exchanger array is aligned with a neck region of the first plurality of neck regions or the second plurality of neck regions and each neck region of the first plurality of neck regions and the second plurality of neck regions has a neck area that is less than the first frontal area or the second frontal area of the heat exchanger with which it is aligned;
wherein the plurality of side curtains define a set of first passages in each of which a cold fluid flows through one of the neck regions of the first plurality of neck regions, then through the corresponding heat exchanger of the first row of heat exchangers, and subsequently through the corresponding second gap of the second gaps;
wherein the plurality of side curtains define a set of second passages in each of which the cold fluid flows through one of the first gaps and the corresponding neck region of the second plurality of neck regions, and subsequently through the corresponding heat exchanger of the second row of heat exchangers;
wherein each of the heat exchangers of the heat exchanger array has a respective first portion with a respective intake covered by a respective first fairing, and a respective second portion with a respective exhaust covered by a respective second fairing; and
wherein each of the plurality of side curtains includes a first pocket for receiving the first fairing or the second fairing of one of the heat exchangers in the first row, and a second pocket for receiving the first fairing or the second fairing of one of the heat exchangers in the second row.

* * * * *